United States Patent
Idriss et al.

(10) Patent No.: US 12,095,222 B2
(45) Date of Patent: Sep. 17, 2024

(54) OLIVE OIL-TUNED BROADBAND CONJUGATED POLYMER LASER MEDIUM

(71) Applicant: IMAM MOHAMMAD IBN SAUD ISLAMIC UNIVERSITY, Riyadh (SA)

(72) Inventors: Hajo Idriss Mohammed Idriss, Riyadh (SA); Mohammed Khalil Mohammed Ali, Riyadh (SA); Osamah Abdulrahman Aldaghri, Riyadh (SA); Khalid Hassan Ibnaouf Ahmed, Riyadh (SA); Moez Abdolfath Ibrahem Mohammed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/096,185

(22) Filed: Jan. 12, 2023

(65) Prior Publication Data

US 2024/0243544 A1    Jul. 18, 2024

(51) Int. Cl.
| | | |
|---|---|---|
| *H01S 3/20* | (2006.01) | |
| *H01S 3/213* | (2006.01) | |
| *H01S 3/00* | (2006.01) | |
| *H01S 3/109* | (2006.01) | |
| *H01S 3/1106* | (2023.01) | |
| *H01S 3/16* | (2006.01) | |

(52) U.S. Cl.
CPC ............ *H01S 3/213* (2013.01); *H01S 3/0092* (2013.01); *H01S 3/109* (2013.01); *H01S 3/1121* (2013.01); *H01S 3/1611* (2013.01); *H01S 3/1643* (2013.01); *H01S 2301/02* (2013.01)

(58) Field of Classification Search
CPC ........ H01S 3/213; H01S 3/0092; H01S 3/109; H01S 3/1121; H01S 3/1611; H01S 3/1643; H01S 2301/02
See application file for complete search history.

(56) References Cited

U.S. PATENT DOCUMENTS

| | | | | |
|---|---|---|---|---|
| 5,237,582 A | * | 8/1993 | Moses | C08G 61/02 372/54 |
| 10,541,506 B1 | * | 1/2020 | Rajendra | H01S 3/1028 |
| 10,746,612 B2 | * | 8/2020 | Atashbar | G01L 1/2287 |
| 2008/0165364 A1 | * | 7/2008 | Zhao | G01N 21/3577 356/451 |
| 2013/0102746 A1 | * | 4/2013 | Zhou | C08G 75/06 526/89 |

(Continued)

OTHER PUBLICATIONS

Aldergazly et al., "Measurement the Fluorescence Parameters of the Olive Oil and Comparing it With Some Laser Dye Materials," Journal of Engineering, vol. 16, No. 1, Mar. 2010.

(Continued)

*Primary Examiner* — Kinam Park
(74) *Attorney, Agent, or Firm* — Nath, Goldberg & Meyer; Joshua B. Goldberg

(57) ABSTRACT

The olive oil-tuned broadband conjugated polymer laser medium includes the conjugated polymer known as poly((9,9-dihexyl-9H-fluorene-2,7-vinylene)-co-(1-methoxy-4-(2-ethylhexyloxy)-2,5-phenylenevinylene)) or "Poly(FV-co-MEHPV)" at a 90:10 mole ratio. The emission wavelength of the olive oil tuned broadband conjugated polymer laser can be reversibly tuned between 500 nm and 680 nm.

10 Claims, 6 Drawing Sheets

(56) References Cited

U.S. PATENT DOCUMENTS

| | | | |
|---|---|---|---|
| 2014/0016064 A1* | 1/2014 | Munoz | G02F 1/1334 |
| | | | 313/503 |
| 2017/0163011 A1* | 6/2017 | Chan | G01H 9/004 |
| 2017/0282214 A1* | 10/2017 | Stiff-Roberts | C08J 5/18 |
| 2019/0296521 A1* | 9/2019 | Yun | H01S 5/1075 |
| 2022/0249428 A1* | 8/2022 | Rauf | C07C 46/10 |

OTHER PUBLICATIONS

Jaffar et al., "Nonlinear Properties of Olive Oil Films Doped With Poly (Methyl Methacrylate), Polystyrene and Their Blend by Using Zscan Technique," International Journal of Advanced Technology in Engineering and Science, vol. No. 3, Special Issue No. 01, Sep. 2015.

"Poly(FV-CO-MEHPV)," Copyright © 2020 Lumtec.

Olive Oil Source, (https://www.oliveoilsource.com/info/chemical-characteristics), p. 1, "Chemical Charateristics", Copyright 1998-2023.

* cited by examiner

OLIVE OIL-TUNED BROADBAND CONJUGATED POLYMER LASER MEDIUM

BACKGROUND

1. Field

The disclosure of the present patent application relates generally to laser media and, particularly, to an olive oil-tuned broadband conjugated polymer laser medium that can be utilized in various technological areas, including medicine and engineering.

2. Description of the Related Art

A lasing medium or active laser medium is the source of optical gain within a laser. Emission wavelength tunability of a laser medium avoids the need for using different lasers for different applications. Many types of laser media with tunable laser characteristics that are currently used are associated with several drawbacks. Sapphire and forsterite have laser characteristics, for example, but these materials are expensive and have limited laser tunability. Ti-sapphire solid-state laser, in particular, is only tunable in the range of 800 nm to 900 nm. Laser dyes such as rhodamine and coumarin have tunable laser properties, but they also have limitations manifested in their physicochemical stability.

Conjugated polymers are superior photonic materials because they exhibit structure and physical features with optical engineering properties comparable to inorganic materials. In addition, many conjugated polymers can emit light either by putting light on a specimen to produce luminescence or by supplying a voltage to these polymers. Researchers are increasingly focusing their efforts on use of a conjugated polymer as a laser medium. Polymers capable of producing light across the whole visible spectrum, in particular, can make ideal tunable lasers. Their absorption coefficients are extraordinarily high, indicating that they can cause significant light amplification. Because of the large gap between the absorption and fluorescence spectra, the material absorbs only a small amount of emitted light, unlike many pigments that need high concentrations. Moreover, conjugated polymers combine the characteristics mentioned earlier for lasing with the typical benefits of polymers, such as the ability to tune their properties by changing the structure of the polymer.

Thus, an olive oil-tuned broadband conjugated polymer laser medium solving the aforementioned problems is desired.

SUMMARY

An olive oil-tuned broadband conjugated polymer laser medium includes olive oil and poly ((9,9-dihexyl-9H-fluorene-2,7-vinylene)-co-(1-methoxy-4-(2-ethylhexyloxy)-2,5-phenylenevinylene)) or "Poly(FV-co-MEHPV)" at a 90:10 mole ratio. The emission wavelength of the olive oil-tuned broadband conjugated polymer laser medium can be reversibly tuned in the range of 500 nm to 700 nm by a change in temperature. The olive oil-tuned broadband conjugated polymer laser medium is capable of working in pulsed and continuous wave (CW) mode in liquid or solid-state.

These and other features of the olive oil-tuned broadband conjugated polymer laser medium will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
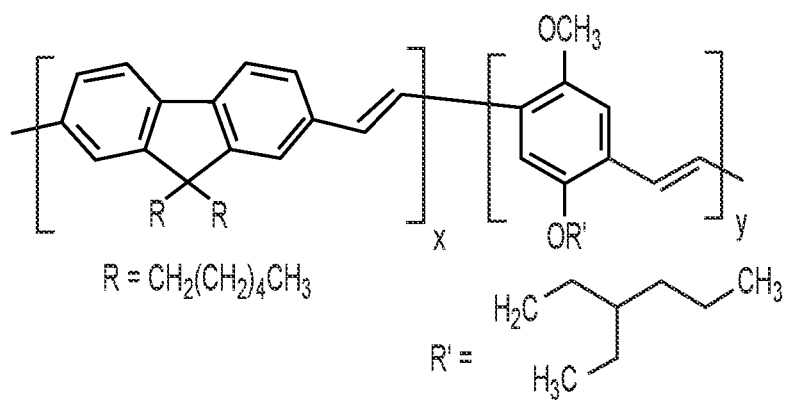
FIG. 1 is the structural formula for Poly(FV-co-MEHPV) polymer.

The olive oil-tuned broadband conjugated polymer laser medium includes olive oil and poly ((9,9-dihexyl-9H-fluorene-2,7-vinylene)-co-(1-methoxy-4-(2-ethylhexyloxy)-2,5-phenylenevinylene)), also referred to herein as "Poly(FV-co-MEHPV)", at a 90:10 mole ratio. The structural formula for Poly(FV-co-MEHPV) is shown in FIG. 1. The emission wavelength of the olive oil-tuned broadband conjugated polymer laser medium or "conjugated polymer in olive oil" can be reversibly tuned in the range of 500 nm to 700 nm, for example, 500 nm to 680 nm. The tuning range can be changed by changing the temperature of the medium.

Figure 5:
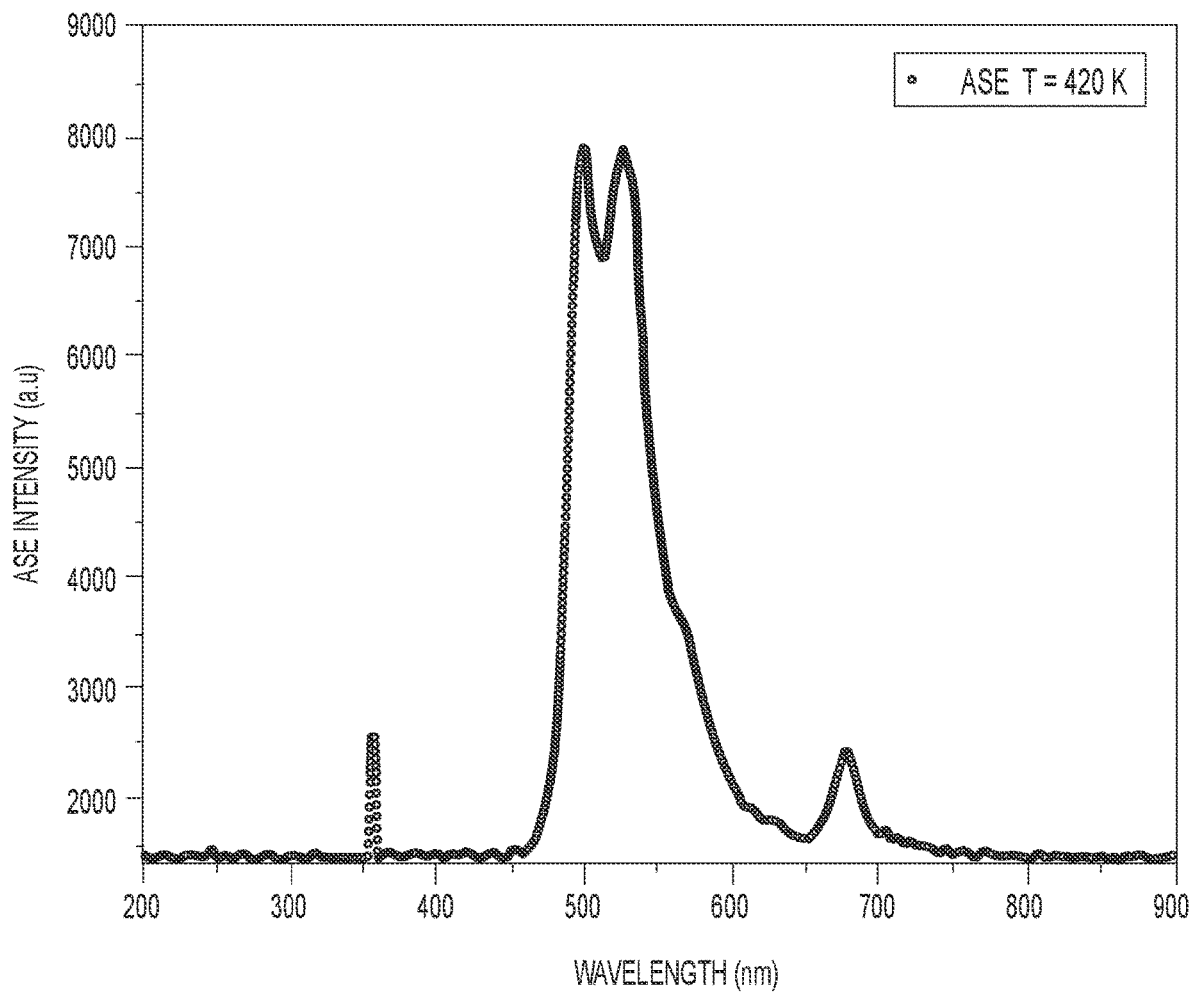
FIG. 5 is a laser spectrum of the conjugated polymer of FIG. 1 in olive oil at a temperature of 420 K.
Figure 6:
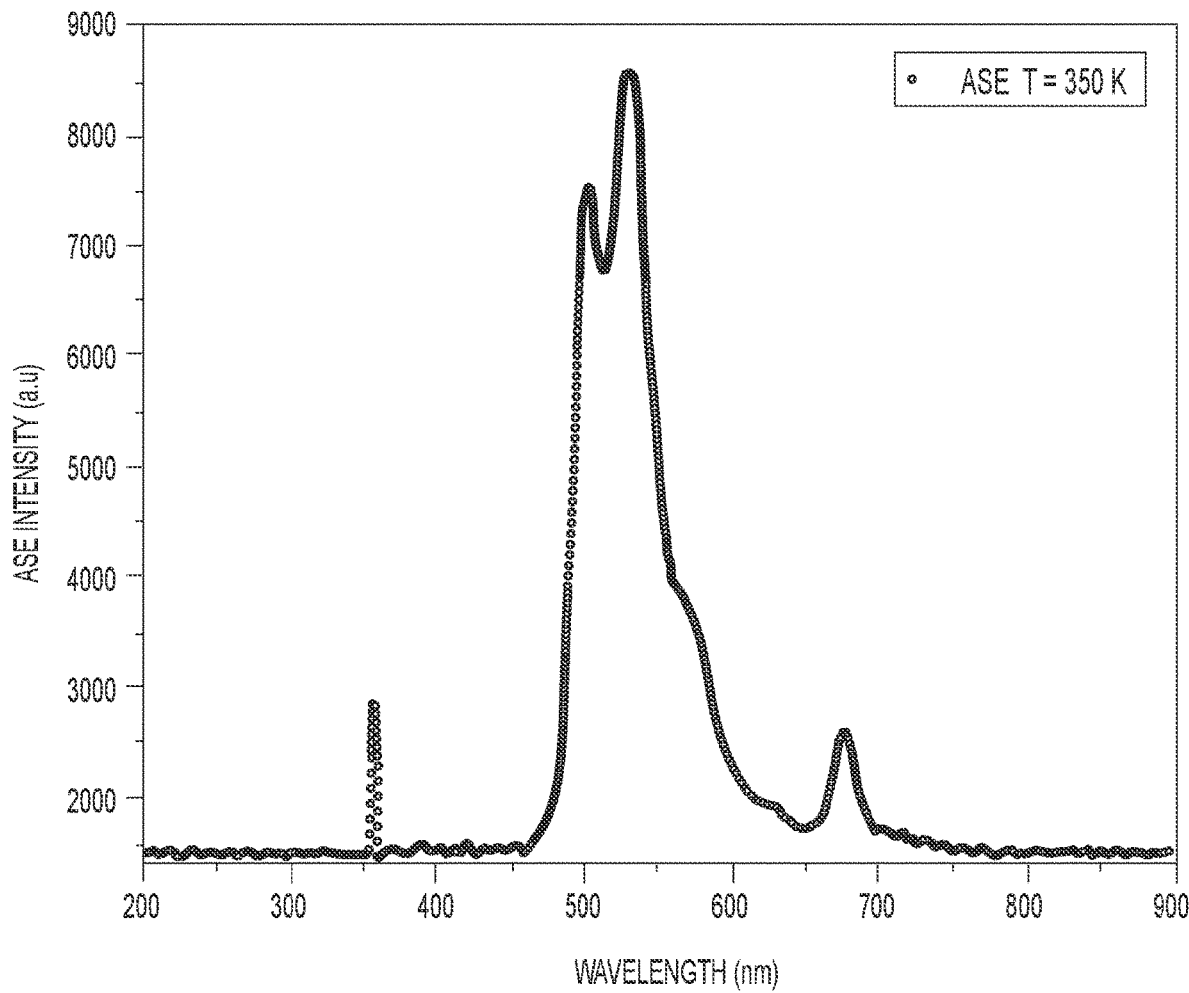
FIG. 6 is a laser spectrum of the conjugated polymer of FIG. 1 in olive oil at a temperature of 350 K.
Figure 7:
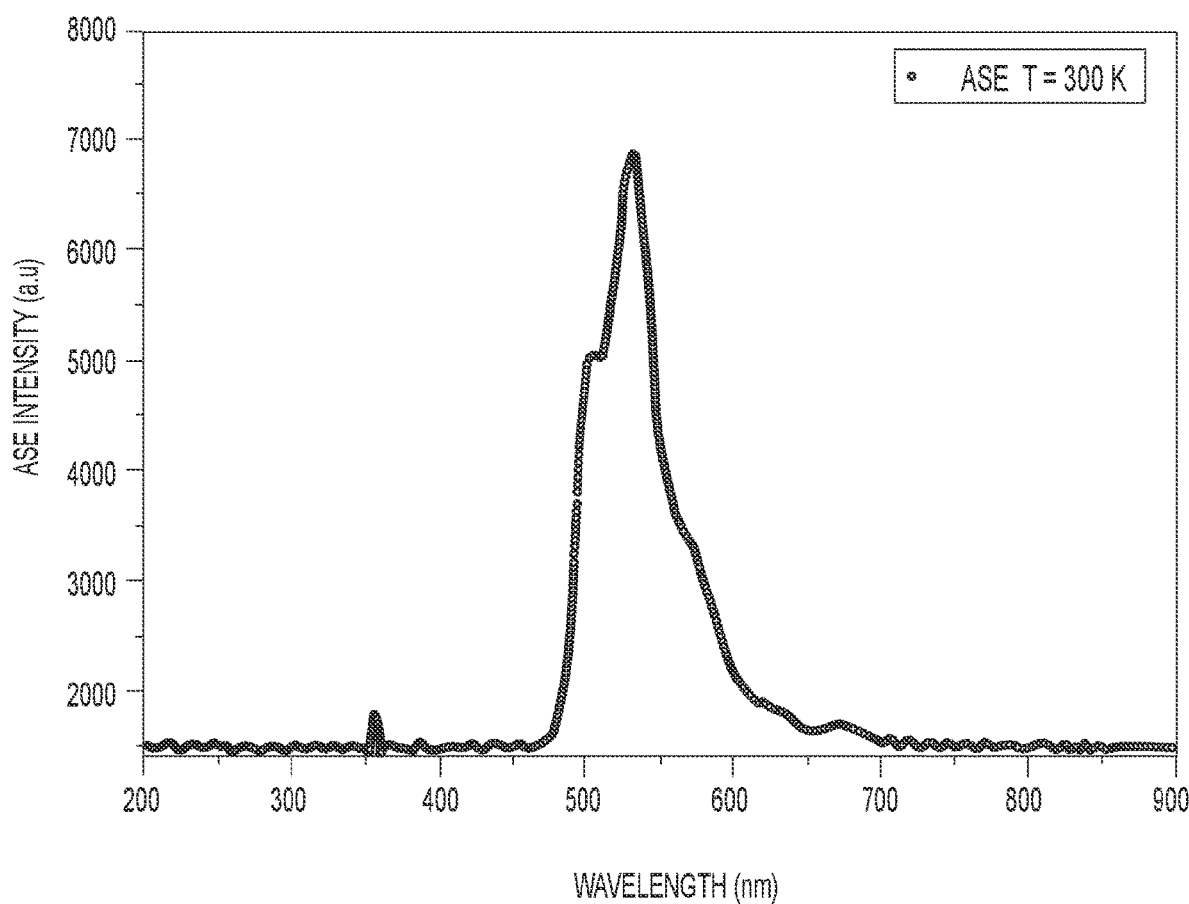
FIG. 7 is a laser spectrum of the conjugated polymer of FIG. 1 in olive oil at a temperature of 300 K.

The olive oil-tuned broadband conjugated polymer laser medium demonstrates amplified spontaneous emission (ASE) at suitable concentration, temperature, and pump energy values. Under the pumping technique of Nd:YAG laser, for example, the olive oil-tuned broadband conjugated polymer laser medium produces ASE. The ASE wavelength can be tuned between 500 nm and 700 nm by changing the temperature of the laser medium within a temperature range of 300 K to 420 K (FIGS. 5-7).

An embodiment of the present teachings is directed to a high-power and temperature-tunable laser based on the olive oil-tuned broadband conjugated polymer laser medium. The wavelength of the laser can be controlled in the 500 nm to 700 nm range by varying the temperature of the laser medium. The temperature can be varied within a temperature range of 300 K to 420 K.

A method of producing the olive-oil tuned broadband conjugated polymer laser medium can include dissolving poly (FV-co-MEHPV) in olive oil over heat while stirring to produce a solution of poly (FV-co-MEHPV) in olive oil or the olive oil-tuned broadband conjugated polymer lasing medium.

The poly (FV-co-MEHPV) in olive oil can produce a broadband laser ranging from 500 nm to 700 nm, for example from 500 nm to 680 nm. The olive oil-tuned broadband conjugated polymer laser medium is capable of working in pulsed and continuous wave (CW) mode. The olive oil-tuned broadband conjugated polymer laser medium is an environmentally friendly material that can be utilized in laser technology instead of toxic and/or carcinogenic solvents typically used as lasing media.

The present disclosure may be better understood in view of the following examples, which are illustrative only and are not intended to limit the present teachings.

Example 1

Preparation and Testing of (FV-Co-MEHPV)

The olive oil-tuned broadband conjugate polymer laser medium was prepared by dissolving poly (FV-co-MEHPV) in olive oil over heat while stirring. The poly (FV-co-MEHPV) was purchased from AMERICAN DYE SOURCE Inc. The absorption and fluorescence spectra of the resulting solution including the conjugated polymer in olive oil were determined.

Figure 3:
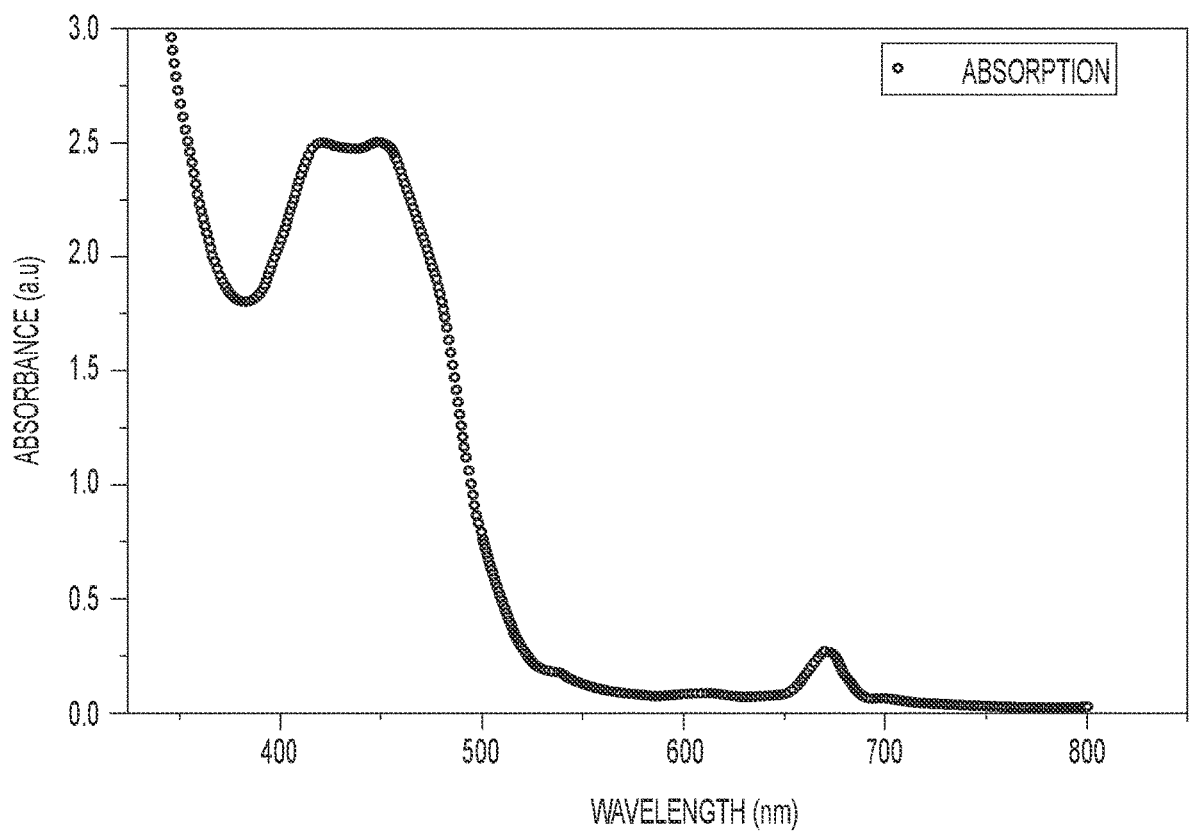
FIG. 3 is an absorption spectrum of the conjugated polymer of FIG. 1 in olive oil.
Figure 4:
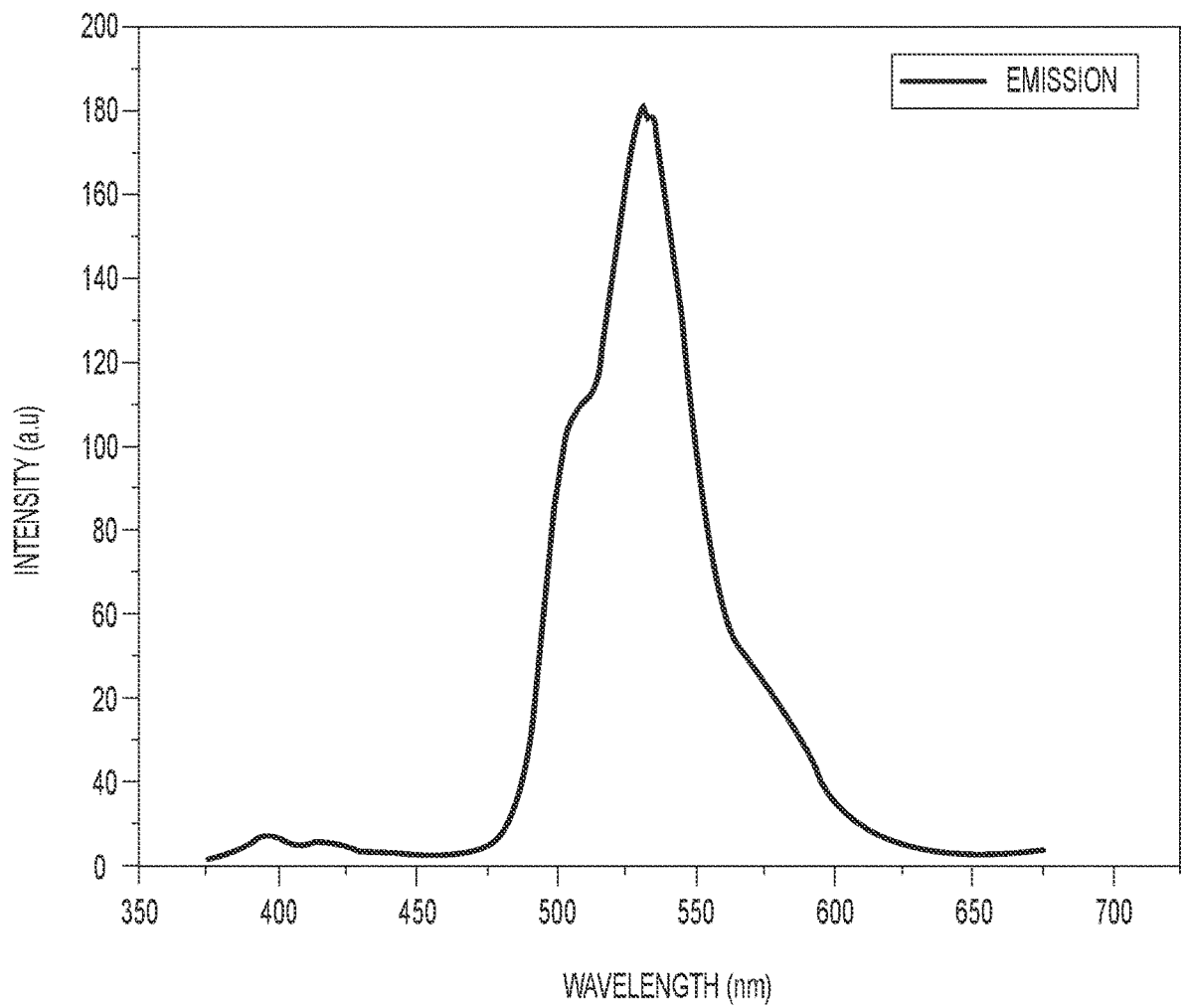
FIG. 4 is a fluorescence spectrum of the conjugated polymer of FIG. 1 in olive oil.

FIG. 3 shows the absorption spectrum of the conjugated polymer in olive oil. As shown, there are five bands, at 421, 450, 535, 610, and 670 nm. FIG. 4 shows fluorescence spectrum of the conjugated polymer in olive oil. The fluorescence spectrum showed four bands, at 505, 535, 577, and 680 nm.

Example 2

Experimental Use of the Olive Oil Tuned Broadband Conjugated Polymer Laser

Figure 2:
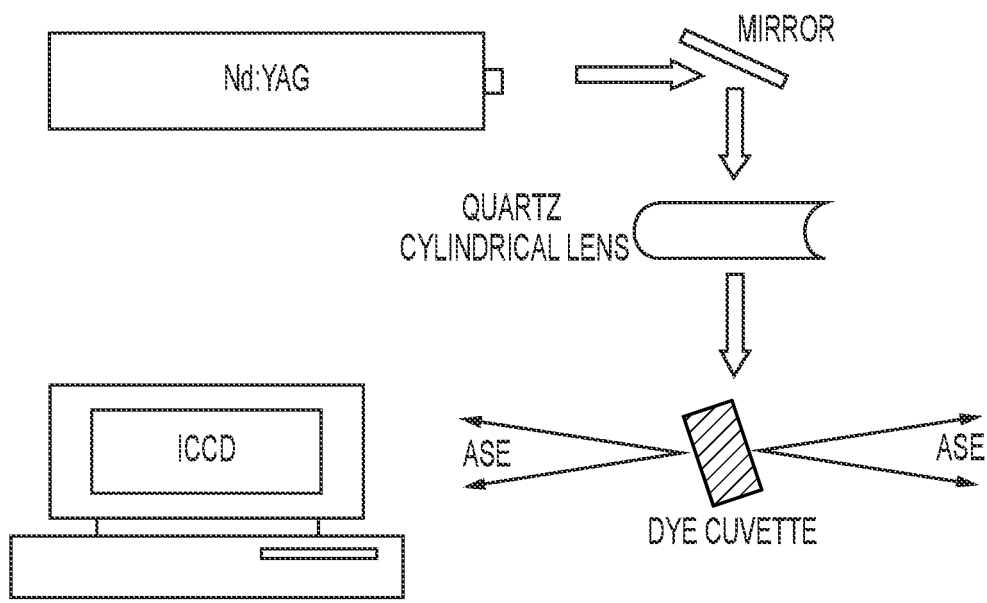
FIG. 2 is a schematic diagram of an exemplary experimental setup for testing the olive oil-tuned broadband conjugated polymer laser medium.

A schematic diagram of the experimental setup of the olive oil-tuned broadband conjugated polymer laser medium is shown in FIG. 2. The third harmonic (355 nm) of an Nd:YAG laser, with a pulse width of 9 ns, was used as the excitation source. The UV laser was focused by a quartz cylindrical lens of a focal length of 5 cm, which was used to do transverse excitation of the FV-co-MEHPV dissolved in olive oil, taken in a four-side polished quartz cell, which was kept canted to avoid feedback. At certain values of pump power, temperature, and concentration of FV-co-MEHPV, an amplified spontaneous emission (ASE) beam was emitted as a cone of light. This was collected by a 1-mm entrance slit of an ICCD camera to obtain the spectral features of ASE. The results revealed that the poly (FV-co-MEHPV) in olive oil could produce a broadband laser ranging from 500 nm to 680 nm.

FIG. 5 shows laser spectra of the conjugated polymer in olive oil at a temperature of 420 K. FIG. 6 shows laser spectra of the conjugated polymer in olive oil at a temperature of 350 K. FIG. 7 shows laser spectra of the conjugated polymer in olive oil at a temperature of 300 K.

It is to be understood that the olive oil-tuned broadband conjugated polymer laser medium is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing an olive oil-tuned broadband conjugated polymer laser medium, comprising the steps of:
providing poly ((9,9-dihexyl-9H-fluorene-2,7-vinylene)-co-(1-methoxy-4-(2-ethylhexyloxy)-2,5-phenylenevinylene));
providing a compound of olive oil as a dye material; and
dissolving the poly ((9,9-dihexyl-9H-fluorene-2,7-vinylene)-co-(1-methoxy-4-(2-ethylhexyloxy)-2,5-phenylenevinylene)) in the compound of olive oil under heat and continuous stirring to obtain a homogenous solution, wherein the homogenous solution is excited under a pulsed laser source having a $\lambda_{ex}$=355 nm, wherein the compound of olive oil is $CH_3(CH_2)_n$ COOH where n is a number between 12 and 22.

2. The method of producing an olive oil-tuned broadband conjugated polymer laser medium of claim 1, wherein said homogenous solution of poly ((9,9-dihexyl-9H-fluorene-2,7-vinylene)-co-(1-methoxy-4-(2-ethylhexyloxy)-2,5-phenylenevinylene)) and the compound of olive oil as a dye material is prepared by dissolving the poly ((9,9-dihexyl-9H-fluorene-2,7-vinylene)-co-(1-methoxy-4-(2-ethylhexyloxy)-2,5-phenylenevinylene)) of the compound of olive oil with the aid of heat and continuous stirring.

3. The method of producing an olive oil-tuned broadband conjugated polymer laser medium of claim 2, wherein a solubility of the poly ((9,9-dihexyl-9H-fluorene-2,7-vinylene)-co-(1-methoxy-4-(2-ethylhexyloxy)-2,5-phenylenevinylene)) increases with increasing temperature.

4. The method of producing an olive oil-tuned broadband conjugated polymer laser medium as recited in claim 1, wherein a third harmonic of 355 nm of an Nd: YAG laser is used as an excitation source.

5. The method of producing an olive oil-tuned broadband conjugated polymer laser medium according to claim 4, wherein a UV laser was focused by a quartz cylindrical lens of a focal length of 5 cm.

6. The method of producing an olive oil-tuned broadband conjugated polymer laser medium as recited in claim 1, wherein absorption spectrum of the conjugated polymer in the compound of olive oil occurs at five bands of 421, 450, 535, 610, and 670 nm, respectively.

7. An olive oil-tuned broadband conjugated polymer laser medium, comprising a mixture of:
poly ((9,9-dihexyl-9H-fluorene-2,7-vinylene)-co-(1-methoxy-4-(2-ethylhexyloxy)-2,5-phenylenevinylene)); and
a compound of olive oil as a dye material,
wherein the poly ((9,9-dihexyl-9H-fluorene-2,7-vinylene)-co-(1-methoxy-4-(2-ethylhexyloxy)-2,5-phenylenevinylene)) is dissolved in the compound of olive oil under heat and continuous stirring to obtain a homogenous solution, wherein the homogenous solution is excited under a pulsed laser source having a $\lambda_{ex}$=355 nm, and wherein the poly ((9,9-dihexyl-9H-fluorene-2,7-vinylene)-co-(1-methoxy-4-(2-ethylhexyloxy)-2,5-phenylenevinylene)) and the compound of olive oil solution is prepared by dissolving the poly ((9,9-dihexyl-9H-fluorene-2,7-vinylene)-co-(1-methoxy-4-(2-ethylhexyloxy)-2,5-phenylenevinylene)) in the compound of olive oil with the aid of heat and continuous stirring, wherein the compound of olive oil is $CH_3 (CH_2)_n COOH$ where n is a number between 12 and 22.

8. The method of producing an olive oil-tuned broadband conjugated polymer laser medium as recited in claim 1, wherein tunability depends on the concentration of the poly ((9,9-dihexyl-9H-fluorene-2,7-vinylene)-co-(1-methoxy-4-(2-ethylhexyloxy)-2,5-phenylenevinylene)).

9. The method of producing an olive oil-tuned broadband conjugated polymer laser medium as recited in claim 1, wherein a fluorescence spectrum of the conjugated polymer showed four bands at 505, 535, 577, and 680 nm, respectively.

10. The method of producing an olive oil-tuned broadband conjugated polymer laser medium as recited in claim 1, wherein the pulsed laser source is capable of working in both a pulsed and continuous wave modes.

* * * * *